(12) United States Patent
Mittal et al.

(10) Patent No.: US 12,524,192 B2
(45) Date of Patent: Jan. 13, 2026

(54) POWER STATE DETECTION VIA AUDIO SIGNAL CAPTURE

(71) Applicant: Caavo Inc, Milpitas, CA (US)

(72) Inventors: Neha Mittal, Bangalore (IN); Siddharth Kumar, Bangalore (IN); Bitto Niclavose, Kottayam (IN); Ashish D. Aggarwal, Stevenson Ranch, CA (US); Vinod K. Gopinath, Bangalore (IN); Sharath H. Satheesh, Bangalore (IN)

(73) Assignee: Caavo Inc, Milpitas, CA (US)

( * ) Notice: Subject to any disclaimer, the term of this patent is extended or adjusted under 35 U.S.C. 154(b) by 250 days.

(21) Appl. No.: 17/935,650

(22) Filed: Sep. 27, 2022

(65) Prior Publication Data

US 2023/0099383 A1   Mar. 30, 2023

Related U.S. Application Data

(60) Provisional application No. 63/249,211, filed on Sep. 28, 2021.

(51) Int. Cl.
*G06F 3/06* (2006.01)
*G01H 3/12* (2006.01)
*G06F 1/3218* (2019.01)
*G06F 3/16* (2006.01)
*G08B 21/04* (2006.01)
*G10L 15/22* (2006.01)
*G10L 25/51* (2013.01)
*H04R 29/00* (2006.01)

(52) U.S. Cl.
CPC ............... *G06F 3/16* (2013.01); *G01H 3/12* (2013.01); *G06F 1/3218* (2013.01); *G08B 21/0438* (2013.01); *G10L 15/22* (2013.01); *G10L 25/51* (2013.01); *H04R 29/001* (2013.01); *H04R 2499/15* (2013.01)

(58) Field of Classification Search
CPC ..... G10L 15/22; H04R 2499/15; H04N 5/268
See application file for complete search history.

(56) References Cited

U.S. PATENT DOCUMENTS

| | | | | |
|---|---|---|---|---|
| 5,774,859 A * | 6/1998 | Houser | ................... | G10L 15/26 348/E5.103 |
| 6,538,556 B1 * | 3/2003 | Kawajiri | ................ | G08C 23/04 340/3.1 |
| 11,138,858 B1 | 10/2021 | Segal | | |
| 2015/0244472 A1 * | 8/2015 | Poppe | ................... | H04B 11/00 367/135 |

(Continued)

*Primary Examiner* — Shaun Roberts
(74) *Attorney, Agent, or Firm* — Sterne, Kessler, Goldstein & Fox P.L.L.C.

(57) ABSTRACT

Embodiments are provided for automatically determining the power state of a consumer electronic device, such as a television. For instance, a switching device may transmit a reference audio signal to a consumer electronic device for playback thereby. An audio signal captured by a microphone is compared to a reference audio signal. If a level of similarity between the captured audio signal and the reference audio signal meet a threshold condition, then a determination is made that the consumer electronic device is powered on. Otherwise, a determination is made that the consumer electronic device is powered off, in a standby state or muted.

20 Claims, 8 Drawing Sheets

(56) References Cited

U.S. PATENT DOCUMENTS

| | | | |
|---|---|---|---|
| 2016/0142648 A1* | 5/2016 | Gopinath | H04N 21/42204 |
| | | | 348/705 |
| 2018/0287808 A1* | 10/2018 | Liston | G06F 11/3438 |
| 2018/0338191 A1 | 11/2018 | Van Scheltinga et al. | |
| 2019/0274003 A1 | 9/2019 | Karuppiah | |
| 2020/0057606 A1 | 2/2020 | Jeong | |
| 2021/0065719 A1* | 3/2021 | Wang | G06F 16/783 |
| 2022/0167040 A1* | 5/2022 | Richardson | H04R 29/004 |
| 2023/0101966 A1 | 3/2023 | Mittal et al. | |

* cited by examiner

POWER STATE DETECTION VIA AUDIO SIGNAL CAPTURE

CROSS-REFERENCE TO RELATED APPLICATIONS

This application claims priority to U.S. Provisional Patent Application No. 63/249,211, titled "POWER STATE DETECTION VIA AUDIO SIGNAL CAPTURE," and filed Sep. 28, 2021, the entirety of which is incorporated by reference herein.

BACKGROUND

The number of devices in a living room is an ever-growing list. Many of these devices are controlled from an infrared (IR) remote. There are also devices that are controlled via RF (radio frequency), IP (Internet Protocol), BT (Bluetooth) and HDMI (High Definition Multimedia Interface), among other control types. As a result, the remotes that the user needs to have to control these devices also grows proportionately to the number of devices he has. In order to simplify the control of all these devices, a home entertainment automation control system is used, which provides the user a single-point control device (such as a hand held remote, a tablet or a computer). While the system eases the uses of the entertainment system, it can cause problems in some scenarios and totally fall apart if the power state of the devices is not in sync in which case the user can end up getting frustrated. For example, an HDMI switch connected to a TV/SS (Sound System) that does not have HDMI-CEC (Consumer Electronics Control) will not be able to determine the power state of the TV if the TV remote is used to turn it on/off.

BRIEF SUMMARY

Methods, systems, and apparatuses are described for the automatic determination of a power state of consumer electronic devices, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
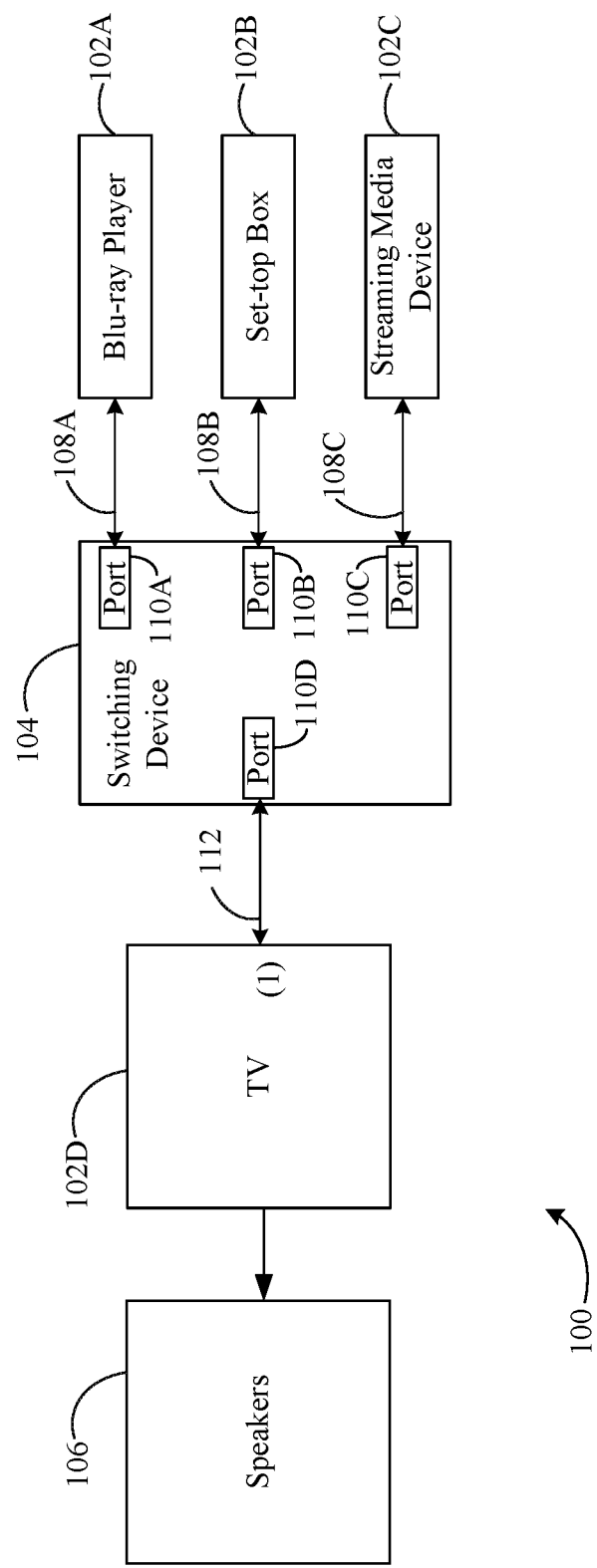
FIG. 1 is a block diagram of a media system configured to automatically determine a power state of a consumer electronic device coupled to a switching device, according to an exemplary embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described herein. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

A method is described herein. The method includes: transmitting a reference audio signal to a consumer electronic device for playback thereby; capturing an audio signal via a microphone while the reference audio signal is played back by the consumer electronic device; comparing the audio signal captured via the microphone to the reference audio signal; determining whether a level of similarity between the captured audio signal and the reference audio signal meets a threshold condition; in response to determining that the level of similarity between the captured audio signal and the reference audio signal meets the threshold condition, determining that the consumer electronic device is in a powered-on state; and in response to determining that the level of similarity between the captured audio signal and the reference audio signal does not meet the threshold condition, determining that the consumer electronic device is in at least one of a standby state or a powered-off state.

In an implementation of the method, transmitting the reference audio signal comprises: detecting a triggering event; and transmitting the reference audio signal responsive to detecting the triggering event.

In an implementation of the method, the triggering event comprises at least one of: detecting a command from a remote control device, wherein the command is configured to toggle a power state of the consumer electronic device; detecting a voice command via the microphone, wherein the voice command is configured to toggle the power state of the consumer electronic device; or receiving a network-based command via a network interface, the network-based command configured to toggle the power state of the consumer electronic device.

In an implementation of the method, the reference audio signal comprises at least one of: an audio signal of a media content item provided to the consumer electronic device for playback thereby; or at least one of an audio tone or audio pattern provided to the consumer electronic device for playback thereby.

In an implementation of the method, the at least one of the audio tone or the audio pattern is an ultrasonic audio signal.

In an implementation of the method, comparing the audio signal captured via the microphone to the reference audio signal comprises: generating an audio signature of the reference audio signal; and analyzing the audio signal captured via the microphone to determine whether the audio signal comprises the audio signature.

In an implementation of the method, the method further comprises: in response to determining that the consumer electronic device is in at least one of the standby state or the powered-off state, providing a command to the consumer electronic device that causes the consumer electronic device to transition to the powered-on state.

In an implementation of the method, the method further comprises: in response to determining that the consumer electronic device is in the powered-on state, providing a command to the consumer electronic device that causes the consumer electronic device to transition to one of the standby state or the powered-off state.

A system is also described herein. The system includes: at least one processor circuit; and at least one memory that stores program code configured to be executed by the at least one processor circuit. The program code comprises: a power state identification component configured to: transmit a reference audio signal to a consumer electronic device for playback thereby; capture an audio signal via a microphone while the reference audio signal is played back by the consumer electronic device; compare the audio signal captured via the microphone to the reference audio signal; determine whether a level of similarity between the captured audio signal and the reference audio signal meets a threshold condition; in response to determining that the level of similarity between the captured audio signal and the reference audio signal meets the threshold condition, determine that the consumer electronic device is in a powered-on state; and in response to determining that the level of similarity between the captured audio signal and the reference audio signal does not meet the threshold condition, determine that the consumer electronic device is in at least one of a standby state or a powered-off state.

In an implementation of the system, the power state identification component is configured to transmit the reference audio signal by: detecting a triggering event; and transmitting the reference audio signal responsive to detecting the triggering event.

In an implementation of the system, the triggering event comprises at least one of: detecting a command from a remote control device, wherein the command is configured to toggle a power state of the consumer electronic device; detecting a voice command via the microphone, wherein the voice command is configured to toggle the power state of the consumer electronic device; or receiving a network-based command via a network interface, the network-based command configured to toggle the power state of the consumer electronic device.

In an implementation of the system, the reference audio signal comprises at least one of: an audio signal of a media content item provided to the consumer electronic device for playback thereby; or at least one of an audio tone or audio pattern provided to the consumer electronic device for playback thereby.

In an implementation of the system, the at least one of the audio tone or the audio pattern is an ultrasonic audio signal.

In an implementation of the system, the power state identification component is configured to compare the audio signal captured via the microphone to the reference audio signal by: generating an audio signature of the reference audio signal; and analyzing the audio signal captured via the microphone to determine whether the audio signal comprises the audio signature.

In an implementation of the system, the power state identification component is further configured to: in response to determining that the consumer electronic device is in at least one of the standby state or the powered-off state, provide a command to the consumer electronic device that causes the consumer electronic device to transition to the powered-on state.

In an implementation of the system, the power state identification component is further configured to: in response to determining that the consumer electronic device is in the powered-on state, provide a command to the consumer electronic device that causes the consumer electronic device to transition to one of the standby state or the powered-off state.

A computer-readable storage medium having program instructions recorded thereon that, when executed by at least one processor of a computing device, perform a method is further described herein. The method includes: transmitting a reference audio signal to a consumer electronic device for playback thereby; capturing an audio signal via a microphone while the reference audio signal is played back by the consumer electronic device; comparing the audio signal captured via the microphone to the reference audio signal; determining whether a level of similarity between the captured audio signal and the reference audio signal meets a threshold condition; in response to determining that the level of similarity between the captured audio signal and the reference audio signal meets the threshold condition, determining that the consumer electronic device is in a powered-on state; and in response to determining that the level of similarity between the captured audio signal and the reference audio signal does not meet the threshold condition, determining that the consumer electronic device is in at least one of a standby state or a powered-off state.

In an implementation of the computer-readable storage medium, transmitting the reference audio signal comprises:

detecting a triggering event; and transmitting the reference audio signal responsive to detecting the triggering event.

In an implementation of the computer-readable storage medium, the triggering event comprises at least one of: detecting a command from a remote control device, wherein the command is configured to toggle a power state of the consumer electronic device; detecting a voice command via the microphone, wherein the voice command is configured to toggle the power state of the consumer electronic device; or receiving a network-based command via a network interface, the network-based command configured to toggle the power state of the consumer electronic device.

In an implementation of the computer-readable storage medium, the reference audio signal comprises at least one of: an audio signal of a media content item provided to the consumer electronic device for playback thereby; or at least one of an audio tone or audio pattern provided to the consumer electronic device for playback thereby.

II. Example Embodiments

Embodiments are provided for automatically determining the power state of a consumer electronic device, such as a television. For instance, a switching device may transmit a reference audio signal to a consumer electronic device for playback thereby. An audio signal captured by a microphone is compared to a reference audio signal. If a level of similarity between the captured audio signal and the reference audio signal meet a threshold condition, then a determination is made that the consumer electronic device is powered on. Otherwise, a determination is made that the consumer electronic device is powered off, in a standby state or muted.

FIG. 1 is a block diagram of a system 100 configured to automatically determine a power state of a consumer electronic device, such as a television. As shown in FIG. 1, system 100 includes a switching device 104, a plurality of consumer electronic 102A-102D and one or more speakers 106. Switching device 104 may be an HDMI-based switching device, but the embodiments disclosed herein are not so limited.

Consumer electronic devices 102A-102C are configured to provide audio and/or video signals (e.g., audio and/or video signals 108A, 108B, and 108C, respectively) for playback and are referred to as "source" devices. Consumer electronic device 102D is configured to receive audio and/or video signals (e.g., audio and/or video signals 112) and is referred to as a "sink" device. Consumer electronic device 102D is coupled to one or more speakers 106. Speakers 106 may be incorporated in consumer electronic device 102D, or alternatively, may be part of an external sound system that is coupled to consumer electronic device 102D and/or switching device 104. In an embodiment in which speakers 106 are part of an external sound system, speakers 106 may be communicatively coupled to consumer electronic device 102D via a wired interface (e.g., an HDMI cable, an optical cable, a universal serial bus (USB) cable, etc.) or a wireless interface (e.g., Bluetooth).

As shown in FIG. 1, consumer electronic device 102A is coupled to a first AV port 110A of switching device 104, consumer electronic device 102B is coupled to a second AV port 110B of switching device 104, consumer electronic device 102C is coupled to a third AV port 110C of switching device 104, and consumer electronic device 102D is coupled to a fourth AV port 110D of switching device 104. In accordance with an embodiment, AV ports 110A-110D are HDMI ports. However, embodiments described herein are not so limited. As further shown in FIG. 1, consumer electronic device 102A is a Blu-ray player, consumer electronic device 102B is a set-top box, consumer electronic device 102C is a streaming media device, and consumer electronic device 102D is a TV. Examples of a streaming media device include, but are not limited to, a Roku™ device, an AppleTV™ device, a Chromecast™, and the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of consumer electronic devices.

Switching device 104 is configured to select (e.g., switch between) different audio and/or video source devices that are coupled to AV ports 110A-110C (e.g., consumer electronic device 102A, consumer electronic device 102B or consumer electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source device. Audio and/or video signals 112 are provided to consumer electronic device 102D that is coupled to AV port 110D. Audio and/or video signals 112 may also be provided to any other device capable of playing back audio and/or video signals (e.g., speaker(s) 106) that may be coupled consumer electronic device 102D and/or to AV port 102D and/or other port(s) (not shown) of switching device 104.

Switching device 104 may be configured to automatically determine a power state of a consumer electronic device communicatively coupled thereto (e.g., consumer electronic device 102D). Based on the determined power state, switching device 104 may cause one or more actions to be performed. Such actions include, but are not limited to, automatically switching to the AV port(s) to which such consumer electronic device(s) are connected, transmitting one or more commands to such consumer electronic device(s) (e.g., power on/off commands, operational commands (e.g., play/pause commands)), transmitting a notification message to such consumer electronic device(s), etc.

Figure 2:
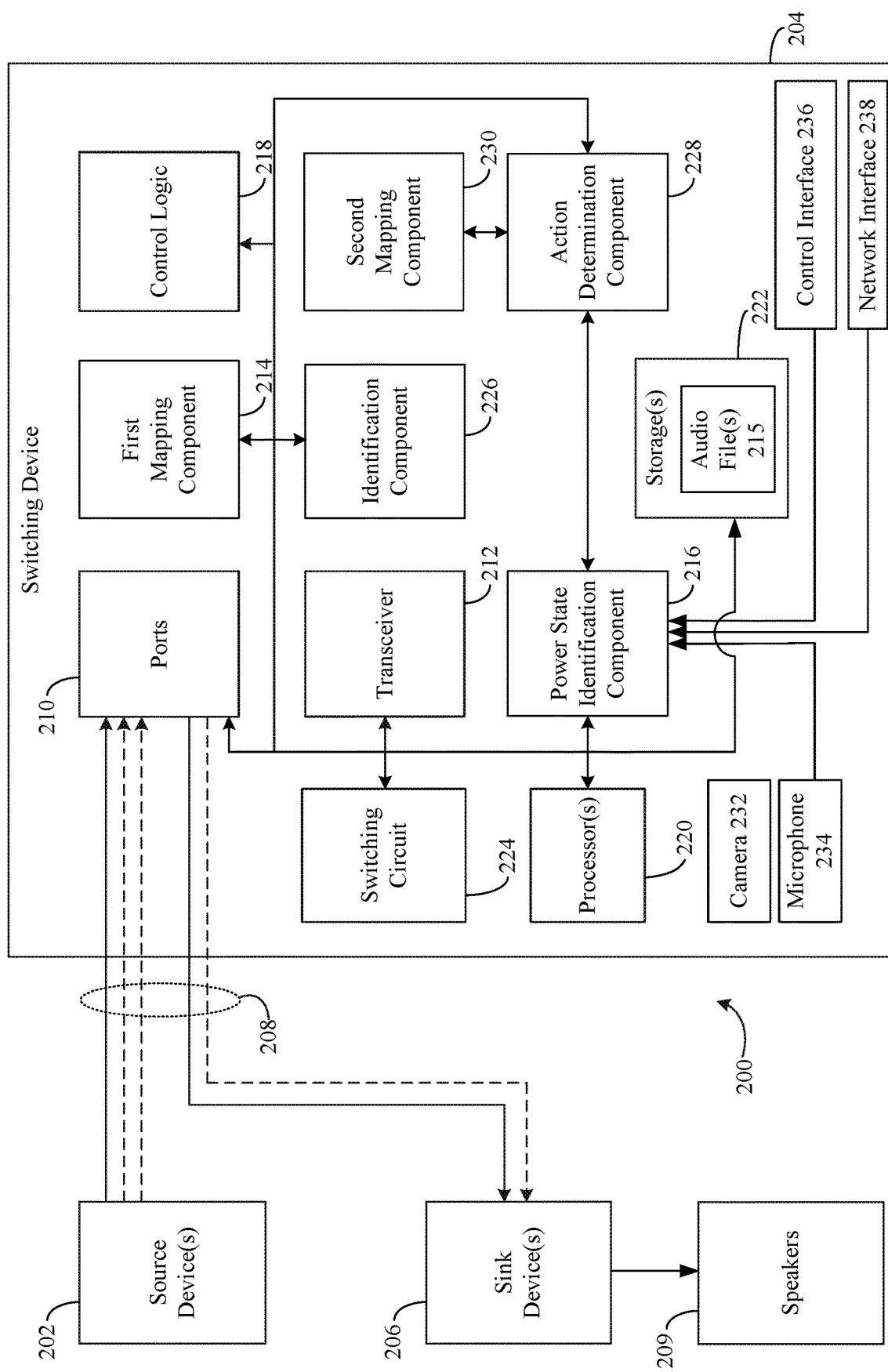
FIG. 2 is a block diagram of a media system configured to automatically determine a power state of a consumer electronic device coupled to a switching device, according to another exemplary embodiment.

Turning now to FIG. 2, an exemplary implementation of a system 200 including a switching device 204 is shown. Switching device 204 is an example of switching device 104, as described above with reference to FIG. 1. Switching device 204 may include and/or encompass the embodiments described herein. That is, switching device 204 of FIG. 2 is configured to perform methods and/or functions as described in embodiments using components and/or sub-components of the described embodiments. For instance, switching device 204 is configured to automatically determine a power state for one or more source device and/or sink devices coupled thereto via port(s) of switching device 204 and perform actions (e.g., control functions) based on the determined power state according to embodiments.

In embodiments, switching device 204 may include some or all of audio/video (A/V) ports 210, one or more storages 222, a first mapping component 214, one or more processors 220, a transceiver 212, control logic 218, a switching circuit 224, a power state identification component 216, a second mapping component 230, an identification component 226, an action determination component 228, a camera 232, a microphone 234, a control interface 236 and/or a network interface 238. Switching device 204 may be coupled to one or more source devices 202, to one or more sink devices 206, and/or speakers 209 via connections 208 (e.g., HDMI connections) as would be understood by persons of skill in the relevant art(s) having the benefit of this disclosure. Source device(s) 202 are examples of consumer electronic device(s)

102A-102C, and sink device(s) 206 are examples of consumer electronic device 102D. In accordance with an embodiment, camera 232 and/or microphone 234 may be incorporated as part of switching device 204. In accordance with another embodiment, camera 232 and/or microphone 234 may be incorporated in a device (e.g., a webcam, a smart phone, a tablet, a remote control device configured to control one or more of switching device 204 source device(s) 202, and/or sink device(s) 206, etc.) that is external to and communicatively coupled to switching device 204 via either a wired or wireless communication interface, as described herein.

A/V ports 210 may include one or more HDMI ports as described herein, although the embodiments described herein are not so limited. Storage(s) 222 may be one or more of any storage device described herein, such as, but not limited to, those described below with respect to FIG. 9. As shown in FIG. 2, storage(s) 222 may include one or more audio files 215. Processor(s) 220 may be one or more of any processing device or processor described herein, such as, but not limited to, those described below with respect to FIG. 9, and may be configured as described elsewhere herein.

Transceiver 212 is configured to receive and transmit wired and/or wireless data according to any protocol and/or embodiment described herein, such as HDMI in HDMI switch embodiments. For instance, transceiver 212 is configured to receive and to transmit audio/video signals according to HDMI protocols from HDMI sources and HDMI sinks respectively.

Identification component 226 may be implemented as hardware (e.g., electrical circuits), or hardware that executes one or both of software (e.g., as executed by a processor or processing device) and firmware. Identification component 226 is configured to operate and perform functions according to the embodiments described herein. For example, identification component 226 may be configured to identify the consumer electronic device (e.g., source device(s) 202 or sink device(s) 206) coupled to each port of AV ports 210. For example, for each source device(s) 202 and/or sink device(s) 206, identification component 226 may be configured to determine identifier(s) thereof, such as, but not limited to a type of the device (e.g., a DVD player, a Blu-ray player, a video game console, a streaming media device, a TV, an HDTV, a projector, etc.), a brand name of the device, a manufacturer of the device, a model number of the device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 226 outputs the identifier(s), which is/are received by first mapping component 214.

First mapping component 214 may be implemented as hardware (e.g., electrical circuits), or hardware that executes one or both of software (e.g., as executed by a processor or processing device) and firmware. First mapping component 214 is configured to operate and perform functions according to the embodiments described herein. First mapping component 214 is configured to determine a device-to-port mapping based on the identifier(s) received from identification component 226. For example, first mapping component 214 may generate a data structure (e.g., a table, a map, an array, etc.) that associates the identifier(s) for any given identified device to the AV port to which that electronic device is coupled. In this way, the device-to-port mapping may indicate that a first source device (e.g., a Blu-ray player) is coupled to a first AV port (e.g., AV Port 1), that a second source device (e.g., a set-top box) is coupled to a second AV port (e.g., AV Port 2), and that a third source device (e.g., a TV) is coupled to a third AV port (e.g., AV Port 3).

Control logic 218 receives the mapping generated by first mapping component 214 and optionally receives the identifiers generated by identification component 226. Based at least in part on the identifiers and mappings, control logic 218 is configured to generate a control signal that is received by switching circuit 224 and/or transceiver 212, configured to cause switching circuit 224 to connect the identified source device(s) 202 and/or sink device(s) 206 on port(s) of A/V ports 210 to corresponding receiver portions or transmitter portions of transceiver 212 and/or causing transceiver 212 to output desired content received from source device(s) 202 on a specified output port of A/V ports 210.

Switching circuit 224 may be implemented as hardware (e.g., electrical circuits), or hardware that executes one or both of software (e.g., as executed by a processor or processing device) and firmware. Switching circuit 224 is configured to operate and perform functions according to the embodiments described herein. For example, switching circuit 224 is configured to provide switched connections between A/V ports 210 and transceiver 212. That is, switching circuit 224 may provide a connection between any port of ports 210 and any receiver component or transmitter component of transceiver 212. Switching circuit 224 may comprise one or more switch circuit portions (e.g., comprising one or more switches/switching elements) and may be combined or used in conjunction with other portions of system 200.

Control interface 236 may comprise a receiver configured to receive wireless control signals from a device, such as a remote control device, a computing device configured to control switching device 204, source device(s) 202, and/or sink device(s) 206. Control interface 236 may be configured to receive, detect, and/or sniff wireless control signals from a plurality of different remote control devices, for example, a dedicated control device configured to control switching device 202, or dedicated control devices each configured to control a respective device of source device(s) 202 and sink device(s) 206. For instance, control interface 236 may comprise a wireless receiver configured to receive control signals transmitted from a remote control device via an IR, an RF-based protocol, and/or an IP-based protocol. Upon detecting control signals, control interface 236 analyzes the control signals to identify one or more identifier(s) therein that uniquely identify the consumer electronic device for which the control signals are intended (e.g., source device(s) 202 and/or sink device(s) 206). Control interface 236 may further determine a command (e.g., a toggle power-on/power-off command, play, fast-forward, pause, rewind, etc.) included in the control signals. The identifier(s) and/or command(s) may be provided to power state identification component 216.

Power state identification component 216 may be implemented as hardware (e.g., electrical circuits), or hardware that executes one or both of software (e.g., as executed by a processor or processing device) and firmware. Power state identification component 216 is configured to operate and perform functions according to the embodiments described herein. For example, power state identification component 216 may be configured to determine a power state with respect to consumer electronic device(s) (e.g., sink device(s) 206 or speakers 209) communicatively coupled to switching device 204. For instance, power state identification component 216 may be configured to determine a power state of sink device(s) 206. Power state identification component 216 may determine a power state of a consumer electronic device responsive to detecting a triggering event. Examples of triggering events are described below.

After detecting a triggering event, power state identification component 216 may cause the consumer electronic device (e.g., a television) to play back an audio signal. For instance, power state identification component 216 may retrieve and/or play audio file(s) 215, which in turn, causes power state identification component 216 to generate a corresponding audio signal. Alternatively, the audio signal may be received by switching device 204 from one of source device(s) 202 via one of ports 210. For instance, the audio signal may comprise the audio content of a piece of media content (e.g., a television show, a movie, etc.) being played back via one of source device(s) 202. The audio signal is provided to the consumer electronic device (e.g., sink device(s) 206). In accordance with an embodiment, the audio signal is provided to the consumer electronic device via a port of ports 210 to which the consumer electronic device is coupled. In accordance with another embodiment, the audio signal is provided to the consumer electronic device via a wireless protocol (e.g., Bluetooth™, ZigBee®, NFC, IEEE 802.11-based protocols, etc.). The audio signal generated and/or provided by switching device 204 is referred herein as a reference audio signal.

The consumer electronic device (e.g., sink device(s) 206) is configured to play back the audio signal provided thereto. For instance, sink device(s) 206 may play back the audio signal via speaker(s) 209, which are examples of speaker(s) 108, as shown in FIG. 1. In accordance with an embodiment, power state identification component 216 may provide a command to the consumer electronic device that causes the consumer electronic device to increase its volume before sending the audio signal. This way, if consumer electronic device is muted or is set to a relatively low volume, the volume will be increased before it plays back the audio signal.

Microphone 234 is configured to configured to detect, capture, and/or record the audio signal being played back via speakers 209. The captured audio signal is provided to power state identification component 216. In accordance with an embodiment, power state identification component 216 is configured to perform a cross correlation of the audio signal captured by microphone 234 with the reference audio signal provided to sink device(s) 206 to determine a power state of sink device(s) 206. The cross correlation between these two signals gives a measure of a sample delay between the signals. Ideally, if the same signal is played from two different sources, and the capture is correlated, they will show a high correlation at a certain sample.

Therefore, cross correlation can be used to determine whether the two signals which are being compared are at least substantially similar or not. Ideally, the maximum normalized correlation between two signals will be 1. However, because an audio signal is being captured via microphone 234, which may be several feet away from speaker(s) 209 (which is playing back the audio), the signal captured by microphone 234 is actually equal to the played out audio, plus ambient noise, plus the effect of room reverberations. In this scenario the maximum correlation will not be 1. Hence, a threshold value (or condition) is estimated through experiment, above which the signals are assumed to be slightly correlated. In order to have some room for accepting a noisy environment, the embodiments described herein use a loose threshold (e.g., 0.5). In accordance with an embodiment, this threshold is met more than one time in a continuous stream of audio to make sure that the high number is seen due to actual signal rather than noise. In response to determining that the threshold condition has been met (e.g., one or more times), power state identification component 216 determines that sink device(s) 206 are in a powered-on state. Otherwise, power state identification component 216 may determine that sink device(s) are in a powered-off or standby state.

Correlation is a computationally expensive process. Calculating the correlation between two signals for a window length of 512 would take 512*511 float multiplication operations and 512*512 float addition operations. Also, for an audio signal with high frequency, this computation is time critical. Thus, for a sampling rate of 48000, processing 512 samples needs to be done within 10.67 ms. Certain techniques may be utilized by power state identification component 216 to reduce the computational complexity. For instance, power state identification component 216 may perform correlation analysis at a low sampling rate (e.g., 2 kHz or 8 kHz), perform correlation in the frequency space using Fast Fourier Transform (FFT-based) techniques, or utilize lower precision sample values (e.g., using 8-bit integer or 16-bit integer sample values rather than floating point values).

In accordance with another embodiment, a signature-based approach is utilized to determine a state of sink device(s) 206. For example, power state identification component 216 may generate an audio signature of the reference audio signal, which is then used for comparison with the audio captured by microphone 234. The information needed for the signature may be derived from the frequency spectrum and may be then combined with timing information to make it more robust. The spectrum may be taken at windowed segments of the reference audio signal. The window length may be chosen empirically depending on the nature of the audio, such as the number of variations in tones and how often they occur. A monotonic sound, for instance, would be the lower limit. The windows need not be overlapping, since it does not add any value for its usage here. From the spectrum, power state identification component 216 may identity key frequency values. Certain criteria are used for identifying these key frequencies. Firstly, it may be a dominant component (i.e., having a relatively large magnitude), if not the peak. Secondly, it may repeat in many of the segments through all or most of the audio. Thirdly, it may be present in the first segment of the audio, which is used to help identify the start of the reference audio signal in the audio signal captured by microphone 234. Fourth, it may not be in the very low or high end of the audible scale, since the frequency response limitations of the devices used for capture and playback should be considered. More than one of such key frequency components can be chosen and used; it will make it more robust.

Once they are identified, power state identification component 216 extracts the intervals between these frequencies. Though these intervals are technically on the frequency axis, owing to the segmentation process described above, they actually encode timing information, by way of providing the timing of the occurrence of these with respect to the start of the audio. This two-pronged information of frequency and timing is then represented in a series of marker pairs, which effectively form the signature for the audio. If more than one key frequency is identified in the earlier step, then the difference in frequencies can be incorporated into the marker along with one of the frequencies.

For the identification process, power state identification component 216 initially processes the incoming stream in segments smaller than that used for signature generation.

This helps to better identify the start of the signal, since exactly matching the segmentation of the reference audio is uncertain if the reference segment size is utilized right away. The segment should not be too small that the energy of the dominant key frequency peak gets split across segments. If needed, this may be continued for the subsequent few segments to get more confidence. Since the matching operation is not expensive, the foregoing may be performed without loss of much time.

Once power state identification component 216 identifies the potential start of the reference audio signal in the audio signal captured by microphone 234, power state identification component 216 adjusts offsets accordingly in order to perform processing in the actual segment size used for signature generation. The subsequent segments should start showing the same key frequencies dominating the spectrum at exactly the same intervals. The spectrum components outside the key frequencies can be filtered out to narrow down the dominant components. The more such matches, the higher the confidence of the match, whereupon power state identification component 216 makes a decision depending on the strictness of the match needed by the application. Typically, a majority match criterion (or threshold condition) may be used, as a 100% match may be too strict. Likewise, a certain tolerance can be provided for the key frequencies as well, thereby making it a narrow range rather than a particular frequency. To quantify the match (or threshold) level, power state identification component 216 may determine a score based on the sum of absolute differences or mean square error of the frequency bins in the markers of the reference and test signal.

If the score reaches or exceeds a predetermined threshold, then power state identification component 216 determines that the consumer electronic device to which the reference audio signal was provided is in a powered-on state. If the score does not reach the predetermined threshold, then power state identification component 216 determines that the consumer electronic device is not powered on (i.e., it is in a powered-off state) or in a standby state.

In accordance with a further embodiment, the audio signal provided to consumer electronic device and played back by consumer electronic device is at least one of an audio tone or audio pattern having a predetermined frequency. For example, the audio tone or pattern is an audio signal that is audible to humans. In another example, the audio tone or pattern is an ultrasonic audio signal (e.g., audio frequencies above 20 Khz, which cannot be heard by humans). In accordance with such an embodiment, microphone 234 is configured to detect, capture, and/or record the ultrasonic audio signal. The captured ultrasonic audio signal is provided to power state identification component 216. Power state identification component 216 is configured to determine the frequency of the audio signal provided by microphone 234. If the frequency is the same as (or similar to) the audio frequency of the ultrasonic audio signal, then power state identification component 216 determines that sink device(s) 206 are in a powered-on state. For instance, power state identification component 216 may compare the frequency of the audio signal provided by microphone 234 to a threshold (e.g., a predetermined range of frequencies in which the frequency of the audio signal provided to consumer electronic device is in). If the frequency falls within the range (i.e., the threshold condition is met), then power state identification component 216 determines that the consumer electronic device is in a powered-on state. Otherwise, power state identification component 216 may determine that the consumer electronic device is in a powered-off or standby state.

In accordance with another embodiment, power state identification component 216 is configured to determine that a state in which the consumer electronic device is in based on the decibel level of the audio signal provided by microphone 234. For instance, if the decibel level exceeds a predetermined threshold condition (e.g., 40 decibels), then power state identification component 216 determines that the consumer electronic device is in a powered-off state. Otherwise, power state identification component 216 may determine that the consumer electronic device is in a powered-off or standby state.

Figure 3:
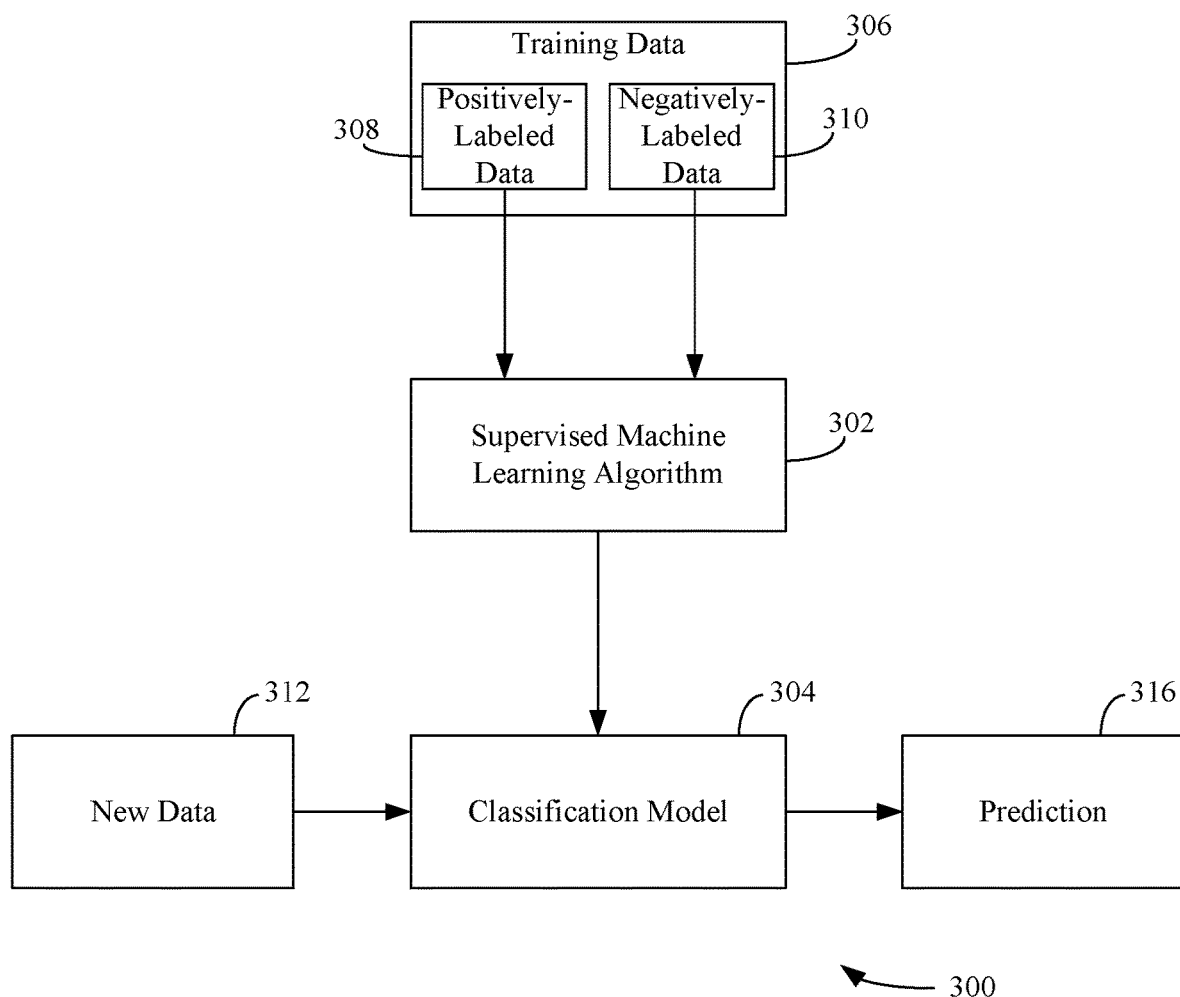
FIG. 3 depicts a block diagram of a system for determining a power state of a consumer electronic device utilizing machine learning-based audio signal analysis in accordance with an example embodiment.

In accordance with a further embodiment, machine learning-based techniques are utilized to analyze audio signals to determine the power state of the consumer electronic device. For example, FIG. 3 depicts a block diagram of a system 300 for determining a power state of a consumer electronic device utilizing machine learning-based audio signal analysis in accordance with an example embodiment. For example, power state identification component 216 (as described above with reference to FIG. 2), may comprise a machine learning algorithm 302, as shown in FIG. 3. In the example shown in FIG. 3, machine learning algorithm 302 is a supervised machine learning algorithm. However, it is noted that the embodiments described herein are not so limited and that other types of machine learning algorithms may be utilized, including, but not limited to, unsupervised machine learning-based algorithms, semi-supervised machine learning-based algorithms, etc.

Machine learning algorithm 302 is configured to learn what constitutes an audio signal being played back by a consumer electronic device and what constitutes other types of audio signals (i.e., audio signals not being played back by a consumer electronic device, such as, but not limited to, white noise, background noise, or other types of audio signals captured in the room in which the consumer electronic device is included). During a training phase, machine learning algorithm 302 may be provided training data 306. Training data 306 may comprise positively-labeled audio signals that comprise audio signals played by consumer electronic devices (e.g., audio signals originating from music, TV shows, movies, and/or any other media content item) (shown as positively-labeled data 308) and negatively-labeled audio signals that comprise audio signals that are not played by consumer electronic devices (e.g., audio signals originating from white noise, background noise, etc.) (shown as negatively-labeled data 310). Positively-labeled data 308 is provided as a first input to supervised machine learning algorithm 302, and negatively-labeled data 310 is provided as a second input to supervised machine learning algorithm 302.

In an example, positively-labeled data 308 may comprise audio file(s) that comprise audio signals played back by a consumer electronic device, and negatively-labeled data 310 may comprise audio file(s) that do not comprise audio signals played back by a consumer electronic device. In another example, during a training period, a user may be instructed to turn on the consumer electronic device and/or play back content via the consumer electronic device. During this period, power state identification component 216 labels the audio signal(s) detected by microphone 234 as positively-labeled data 308. The user may also be instructed to turn off the consumer electronic device. During this period, power state identification component 216 labels the audio signal(s) detected by microphone 234 as negatively-labeled data 310.

Using positively-labeled data 308 and negatively-labeled data 310, supervised machine learning algorithm 302 learns what constitutes an audio signal being played back by a consumer electronic device and what constitutes other types of audio signals and generates a classification model 304 that is utilized to classify new audio signal(s) (shown as new data 312) detected by microphone 234 as being an audio signal being played back by a consumer electronic device or an audio signal not being played back by a consumer electronic device. Classification model 304 may output an indication (e.g., a prediction 316) as to whether a detected audio signal (i.e., new data 312) comprises an audio signal played back by a consumer electronic device.

In accordance with an embodiment, prediction 316 outputted by classification model 304 is a probability that a detected audio signal comprises an audio signal that was played back by a consumer electronic device. Power state identification component 216 may compare the probability to a threshold. If the probability exceeds the threshold, power state identification component 216 may determine that the audio signal provided to classification model 304 was played back by the consumer electronic device. This may result in a determination that the consumer electronic device is in a powered-on state. If the probability does not exceed the threshold, power state identification component 216 may determine that the audio signal provided to classification model 304 was not played back by the consumer electronic device. This may result in a determination that the consumer electronic device is in a standby state or in a powered-off state.

Referring again to FIG. 2, action determination component 228 may be implemented as hardware (e.g., electrical circuits), or hardware that executes one or both of software (e.g., as executed by a processor or processing device) and firmware. Action determination component 228 is configured to operate and perform functions according to the embodiments described herein. For example, action determination component 228 may be configured to, based on the power state, perform at least one action with respect to a particular consumer electronic device. For example, and without limitation, action determination component 228 may issue a toggle command to source device(s) 202 and/or sink device(s) 206 to toggle power (i.e., to turn it off or on), issue an operational command to source device(s) 202 and/or sink device(s) 206, such as "play" or "pause", transmit a notification message to source device(s) 202 and/or sink device(s) 206, and/or automatically cause switching device 204 to switch to port(s) of ports 210 to which a particular source device of source device(s) 202 and/or a particular sink device of sink device(s) 206 are connected. Action determination component 228 may determine the action(s) to be performed using second mapping component 230.

Second mapping component 230 may be implemented as hardware (e.g., electrical circuits), or hardware that executes one or both of software (e.g., as executed by a processor or processing device) and firmware. Second mapping component 230 is configured to operate and perform functions according to the embodiments described herein. Second mapping component 230 is configured to maintain a power state-to-action mapping that specifies action(s) that are to be performed by switching device 204 based on the power state for a particular device. Second mapping component 230 may maintain a power state-to-action mapping for each of source device(s) 202 and/or sink device(s) 206. Each power state-to-action mapping may comprise a data structure (e.g., a table) that associates the action(s) to take for any given power state. Action determination component 228 may reference second mapping component 230 to determine the action(s) to be performed in response to detecting a triggering event.

One example of a triggering event may be determining that a user has performed an action intended to cause any or all of source device(s) 202 and/or sink device(s) 206 to transition to a desired power state. One such action may be providing a command (e.g., via interacting with a particular interface element (e.g., a button or selectable icon) (or the like) of a remote control device or via a voice command) that is configured to power on or off particular source device(s) 202 and/or sink device(s) 206. For instance, a user may interface with a "Watch DVD" interface element on a remote control device or speak the words "Watch DVD" in a microphone included in the remote control device and/or switching device 204. Control interface 236 may detect the command and cause power state identification component 216 to determine the power state of consumer electronic device(s) coupled to switching device 204 (such as sink device(s) 206).

Another example of a triggering event is receiving a command via network interface 238. Network interface 238 is configured to interface with remote sites or one or more networks and/or devices via wired or wireless connections. Examples of networks include, but are not limited to, local area networks (LANs), wide area networks (WANs), the Internet, etc. In a particular example, suppose a user remotely-located from system 200 (e.g., in another house, building, etc.) would like send a notification (e.g., an emergency notification ("Severe Thunderstorm Warning," "There's a fire in the building, evacuate immediately," etc.), a notification to initiate a video call, etc.) to be displayed on sink device(s) 206 with the intent of the user of sink device(s) 206 reading the notification. If sink device(s) 206 are powered off, the notification will never be displayed.

The determined power state and/or detected command may be provided to action determination component 228, which provides the power state and/or command to second mapping component 230, which provides the action(s) to be performed based on the power state and/or the detected command. For instance, second mapping component 230 may associate various commands to the power state-to-action mapping to determine which action should be taken based on the command received and the power state of a sink device(s) 206. For example, suppose the command received is a "Watch DVD" command, and the determined power state of a TV indicates that the TV is in a powered-off state. The power state-to-action mapping may specify that switching device 204 is to send a toggle command to the TV that causes the TV to power itself on. If the power state for the TV indicates that the TV is powered-on, the power state-to-action mapping may specify that no action is to be taken with respect to the TV player (since the toggle command would result in the TV player turning off). In another example, suppose the notification is a network-based notification received via network interface 238. Further suppose that the determined power date of a TV indicates that the TV is a powered-off. The power state-to-action mapping may specify that switching device 204 is to send a toggle command to the TV that causes the TV to power itself on so that the notification may be viewed. If the power state for the TV indicates that the TV is powered-on, the power state-to-action mapping may specify that no action is to be taken with respect to the TV player (since the toggle command would result in the TV player turning off). In each of the examples, the power state-to-action mapping may further specify that switching device 204 is to automatically switch to the port of ports 210 to which the TV player is coupled. Switching device 204 may utilizes the device-to-port mapping of first mapping component 214 to determine the port to which the TV is coupled.

Figure 4:
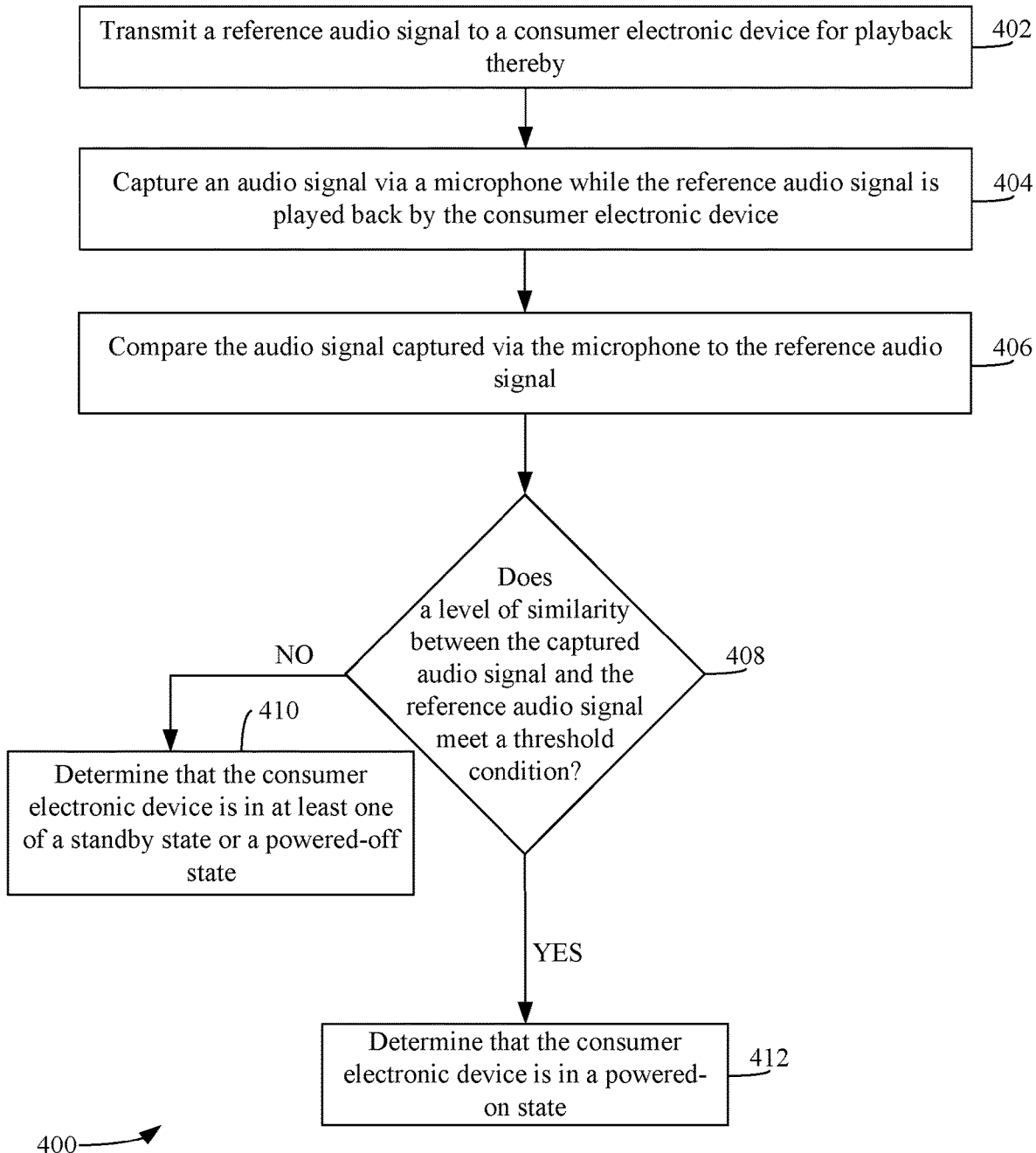
FIG. 4 is a flowchart of a method for determining a power state for a consumer electronic device, according to an exemplary embodiment.

Accordingly, in embodiments, switching device 204 may determine a power state for a consumer electronic device in many ways. For instance, FIG. 4 depicts a flowchart 400 for determining a power state of a consumer electronic device in accordance with an embodiment. The method of flowchart 400 may be implemented by system 200 as described above in reference to FIG. 2. Accordingly, flowchart 400 will be described with continued reference to FIG. 2. Other structural and operational embodiments will be apparent to persons skilled in the relevant art(s) based on the following discussion regarding flowchart 400 and system 200.

Flowchart 400 begins with step 402. At step 402, a reference audio signal is transmitted to a consumer electronic device for playback thereby. For example, with reference to FIG. 2, switching device 204 transmits a reference audio signal to sink device(s) 206 and/or speakers 209 for playback thereby. For instance, power state identification component 216 transmits a reference audio signal to sink device(s) 206 via a port of ports 210 by which sink device(s) 206 are communicatively coupled to switching device, via control interface 236 by which sink device(s) 206 are communicatively coupled, or via network interface 238 by which sink device(s) 206 are communicatively coupled. Additional details regarding transmitting the reference audio signal are described below with reference to FIG. 5.

In accordance with one or more embodiments, the reference audio signal comprises at least one of an audio signal of a media content item provided to the consumer electronic device for playback thereby, or at least one of an audio tone or audio pattern provided to the consumer electronic device for playback thereby. For example, with reference to FIG. 2, the reference audio signal comprises at least one of an audio signal of media content (e.g., audio file(s) 215) provided to sink device(s) 206 and/or speakers 209 by switching device 204 and/or via source device(s) 202 that provide the media content. In another example, the reference audio signal comprises at least one of an audio tone or audio pattern provided to sink device(s) 206 and/or speakers 209. The audio tone or audio pattern may stored via audio file(s) 215. In such an example, power state identification component 216 plays back audio file(s) 215, which causes the audio tone or audio pattern to be transmitted to sink device(s) 206 and/or speakers 209.

In accordance with one or more embodiments, the at least one of the audio tone or the audio pattern is an ultrasonic audio signal. For example, with reference to FIG. 2, playback of audio file(s) 215 may result in an ultrasonic audio signal to be transmitted to sink device(s) 206 and/or speakers 209.

At step 404, an audio signal is captured via a microphone while the reference audio signal is played back by the consumer electronic device. For example, with reference to FIG. 2, microphone 234 captures an audio signal while the reference audio signal is played back by sink device(s) 206 and/or speakers 209.

At step 406, the audio signal captured via the microphone is compared to the reference audio signal. For example, with reference to FIG. 2, power state identification component 216 compares the audio signal captured by microphone 234 to the reference audio signal. Additional details regarding comparing the audio signal are described below with reference to FIG. 6.

At step 408, a determination is made as to whether a level of similarity between the captured audio signal and the reference audio signal meets a threshold condition. If a determination is made that the level of similarity between the captured audio signal and the reference audio signal does not meet the threshold condition, then flow continues to step 410. Otherwise, flow continues to step 412. For example, with reference to FIG. 2, power state identification component 216 determines whether a level of similarity between the captured audio signal and the reference audio signal meets a threshold condition At step 410, a determination is made that the consumer electronic device is in at least one of a standby state or a powered-off state. For example, with reference to FIG. 2, power state identification component 216 determines that sink device(s) 206 and/or speakers 209 are in at least one of a standby state or a powered-off state.

In accordance with one or more embodiments, in response to determining that the consumer electronic device is in at least one of the standby state or the powered-off state, a command is provided to the consumer electronic device that causes the consumer electronic device to transition to the powered-on state. For example, with reference to FIG. 2, action determination component 228 may provide a command (e.g., a toggle command transmitted via a port of ports 210, control interface 236, or network interface 238) to sink device(s) 206 and/or speakers 209 that causes sink device(s) 206 and/or speakers 209 to transition to the powered-on state.

At step 412, a determination is made that the consumer electronic device is in a powered-on state. For example, with reference to FIG. 2, power state identification component 216 determines that sink device(s) 206 and/or speakers 209 are in a powered-on state.

In accordance with one or more embodiments, in response to determining that the consumer electronic device is in the powered-on state, a command is provided to the consumer electronic device that causes the consumer electronic device to transition to one of the standby state or the powered-off state. For example, with reference to FIG. 2, action determination component 228 may provide a command (e.g., a toggle command transmitted via a port of ports 210, control interface 236, or network interface 238) to sink device(s) 206 and/or speakers 209 that causes sink device(s) 206 and/or speakers 209 to transition to one of the standby state or the powered-off state.

Figure 5:
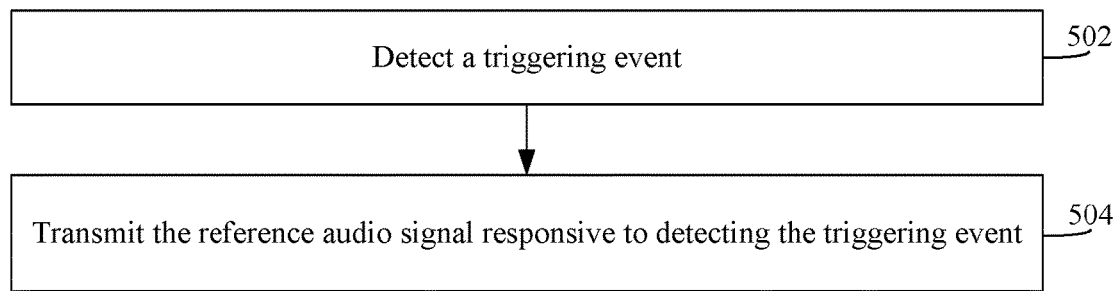
FIG. 5 depicts a flowchart of a method for transmitting a reference audio signal in accordance with an embodiment.

FIG. 5 depicts a flowchart 500 for transmitting a reference audio signal in accordance with an embodiment. The method of flowchart 500 may be implemented by system 200 as described above in reference to FIG. 2. Accordingly, flowchart 500 will be described with continued reference to FIG. 2. Other structural and operational embodiments will be apparent to persons skilled in the relevant art(s) based on the following discussion regarding flowchart 500 and system 200.

Flowchart 500 begins with step 502. At step 502, a triggering event is detected. For example, with reference to FIG. 2, power state identification component 216 detects a triggering event.

In accordance with one or more embodiments, the triggering event comprises at least one of detecting a command from a remote control device, wherein the command is configured to toggle a power state of the consumer electronic device, detecting a voice command via the microphone, wherein the voice command is configured to toggle the power state of the consumer electronic device, or receiving a network-based command via a network interface, the network-based command configured to toggle the power state of the consumer electronic device. For example, with reference to FIG. 2, the triggering event comprises at least one of detecting a command via control interface 236 from a remote control device, the command being configured to toggle a power state of sink device(s) 206 and/or speakers 209, detecting a voice command detected via microphone 234, the voice, command being configured to toggle a power state of sink device(s) 206 and/or speakers 209, or receiving a network-based command via network interface 238, the network-based command being configured to toggle a power state of sink device(s) 206 and/or speakers 209.

At step 504, the reference audio signal is transmitted response to detecting the triggering event. For example, with reference to FIG. 2, power state identification component 216 is configured to transmit the reference audio (e.g., via a port of ports 210, control interface 236, or network interface 238) responsive to detecting the triggering event.

Figure 6:
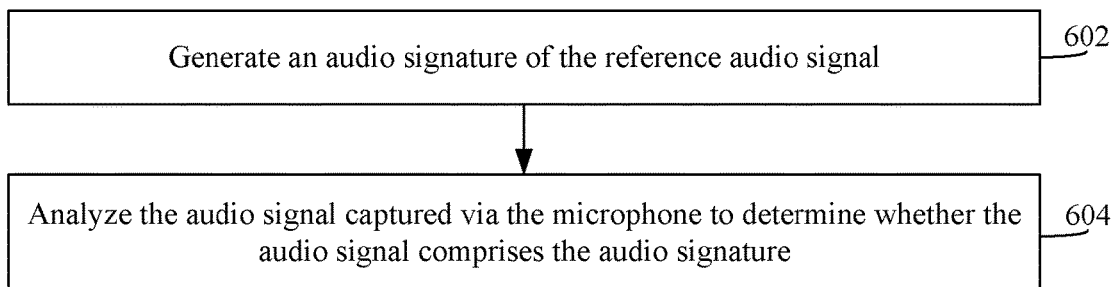
FIG. 6 depicts a flowchart for comparing a captured audio signal to a reference audio signal in accordance with an embodiment.

FIG. 6 depicts a flowchart 600 for comparing a captured audio signal to a reference audio signal in accordance with an embodiment. The method of flowchart 600 may be implemented by system 200 as described above in reference to FIG. 2. Accordingly, flowchart 600 will be described with continued reference to FIG. 2. Other structural and operational embodiments will be apparent to persons skilled in the relevant art(s) based on the following discussion regarding flowchart 600 and system 200.

Flowchart 600 begins with step 602. At step 602, an audio signature of the reference audio signal is generated. For example, with reference to FIG. 2, power state identification component 216 may generate an audio signature of the reference audio signal, which is then used for comparison with the audio captured by microphone 234, as described below with reference to step 604. The information needed for the signature may be derived from the frequency spectrum and may be then combined with timing information to make it more robust. The spectrum may be taken at windowed segments of the reference audio signal. The window length may be chosen empirically depending on the nature of the audio, such as the number of variations in tones and how often they occur. A monotonic sound, for instance, would be the lower limit. The windows need not be overlapping, since it does not add any value for its usage here. From the spectrum, power state identification component 216 may identify key frequency values. Certain criteria are used for identifying these key frequencies. Firstly, it may be a dominant component (i.e., having a relatively large magnitude), if not the peak. Secondly, it may repeat in many of the segments through all or most of the audio. Thirdly, it may be present in the first segment of the audio, which is used to help identify the start of the reference audio signal in the audio signal captured by microphone 234. Fourth, it may not be in the very low or high end of the audible scale, since the frequency response limitations of the devices used for capture and playback should be considered. More than one of such key frequency components can be chosen and used; it will make it more robust.

Once they are identified, power state identification component 216 may extract the intervals between these frequencies. Though these intervals are technically on the frequency axis, owing to the segmentation process described above, they actually encode timing information, by way of providing the timing of the occurrence of these with respect to the start of the audio. This two-pronged information of frequency and timing is then represented in a series of marker pairs, which effectively form the signature for the audio. If more than one key frequency is identified in the earlier step, then the difference in frequencies can be incorporated into the marker along with one of the frequencies.

At step 604, the audio signal captured via the microphone is analyzed to determine whether the audio signal comprises the audio signature. For example, with reference to FIG. 2, power state identification component 216 initially processes the incoming audio stream (i.e., the audio signal detected by microphone 234) in segments smaller than that used for signature generation. This helps to better identify the start of the audio signal, since exactly matching the segmentation of the reference audio signal is uncertain if the reference segment size is utilized right away. The segment should not be too small that the energy of the dominant key frequency peak gets split across segments. If embodiments, this may be continued for the subsequent few segments to get more confidence. Since the matching operation is not expensive, the foregoing may be performed without loss of much time.

Once power state identification component 216 identifies the potential start of the reference audio signal in the audio signal captured by microphone 234, power state identification component 216 adjusts offsets accordingly in order to perform processing in the actual segment size used for signature generation. The subsequent segments should start showing the same key frequencies dominating the spectrum at exactly the same intervals. The spectrum components outside the key frequencies can be filtered out to narrow down the dominant components. The more such matches, the higher the confidence of the match, whereupon power state identification component 216 makes a decision depending on the strictness of the match needed by the application. Typically, a majority match criterion (or threshold condition) may be used, as a 100% match may be too strict. Likewise, a certain tolerance can be provided for the key frequencies as well, thereby making it a narrow range rather than a particular frequency. To quantify the match (or threshold) level, power state identification component 216 may determine a score based on the sum of absolute differences or mean square error of the frequency bins in the markers of the reference and test signal.

If the score reaches or exceeds a predetermined threshold, then power state identification component 216 determines that the consumer electronic device to which the reference audio signal was provided is powered on. If the score does not reach the predetermined threshold, then power state identification component 216 determines that the consumer electronic device is not powered on (i.e., it is in a powered-off state) or in a standby state.

III. Additional Embodiments

Figure 7:
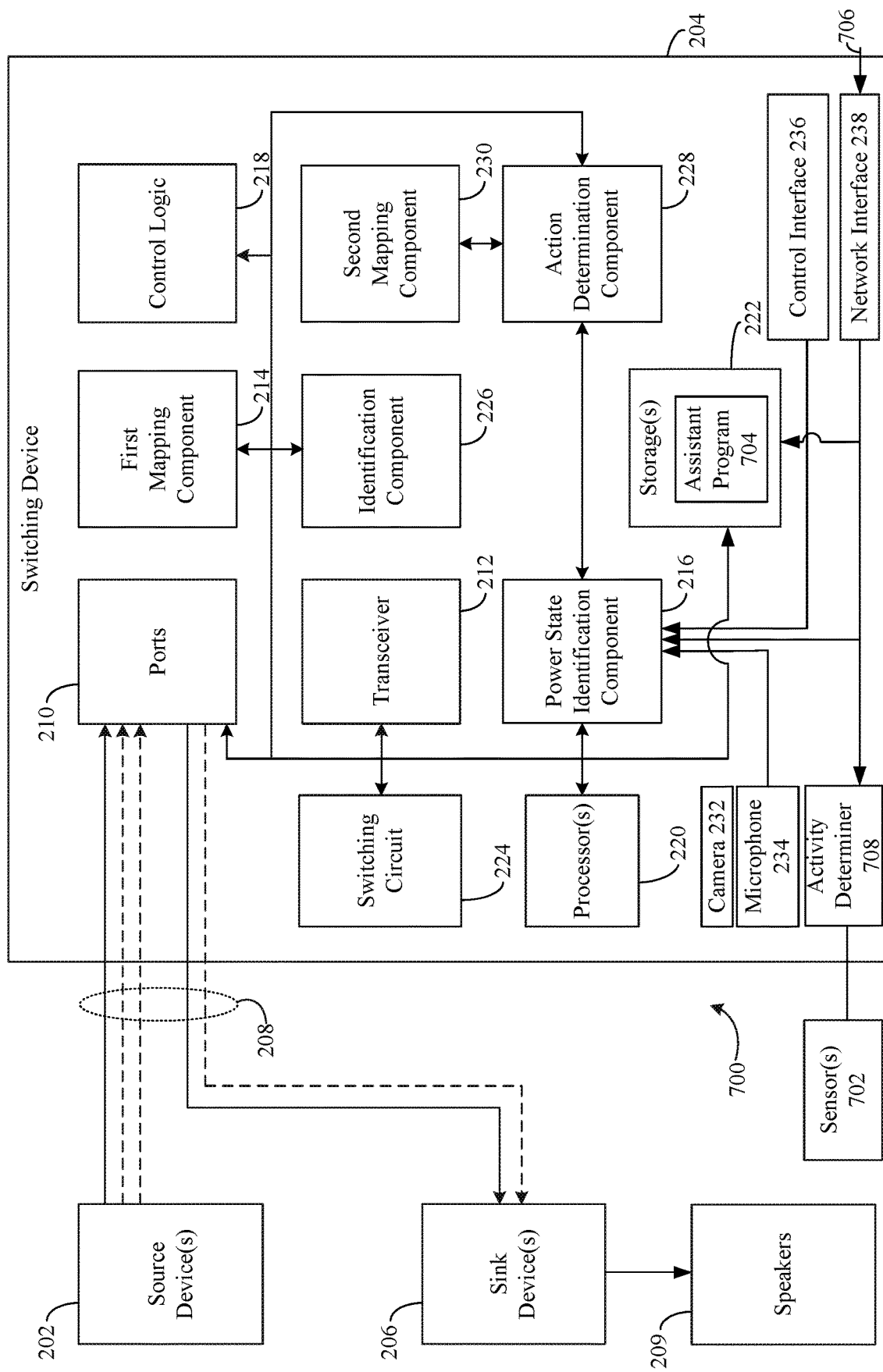
FIG. 7 depicts a block diagram of a system configured to determine whether a user is unresponsive and/or to assist the user in accordance with an example embodiment.

The embodiments described herein may be utilized to determine whether a user of the consumer electronic devices and/or the switching device described herein is unresponsive and/or to assist the user. For example, FIG. 7 depicts a block diagram of a system 700 configured to determine whether a user is unresponsive and/or to assist the user in accordance with an example embodiment. As shown in FIG. 7, system 700 comprises source device(s) 202, switching device 204, sink device(s) 206, speakers 209, and one or more sensor(s) 702. One or more of sensor(s) 702 may be incorporated within switching device 204. Alternatively, one or more of sensor(s) 702 may be external to switching device 204 and communicatively coupled thereto, for example, via ports 210, control interface 236 or network interface 238.

Switching device 204 may be configured to detect a triggering event that causes switching device 204 to determine whether a user of the source device(s) 202, sink device(s) 206, and/or switching device 204 is unresponsive and/or requires assistance. For example, the triggering event may be a command received via control interface 236 or network interface 238. For instance, suppose a person wanted to check in on a friend or loved one. The person may initiate a command 706 using an application from a remote location. Command 706 is configured to initiate an interaction with the person or an assistant and is received by network interface 238.

Responsive to receiving command 706, power state identification component determines the power state of sink device(s) 206 in accordance with the embodiments described above. Responsive to determining that the sink device(s) 206 are in one of a standby state or a powered-off state, a toggle on/off command is provided by switching device 204 to the sink device(s) 206 to transition sink device(s) 206 to a powered-on state in accordance with the embodiments described above.

After sink device(s) 206 are in a powered-on state, an interaction with the person or an assistant is initiated. For instance, a video call may be initiated with the person or a human assistant. In another example, the assistant is a virtual assistant. For instance, storage(s) 222 may store a virtual assistant program 704. When executed, virtual assistant program 704 may render a visual virtual assistant via display device of sink device(s) 206 or cause an audio-based virtual assistant to be played on speakers 209. The virtual assistant may be configured to ask questions and process responses from the user (i.e., engage with a conversation with the user). For example, the virtual assistant may ask whether the user is OK, or ask how the user is doing, etc. If the user answers in the affirmative or responds positively, then the virtual assistant may determine that the user is responsive and doing OK. The virtual assistant may also utilize images taken by camera 232 and analyze characteristics of the user ascertained from the images (e.g., facial expressions, etc.) to determine the state of the user. In response to determining that the user is unresponsive or requires help, the virtual assistant may initiate a call and/or provide a notification to another user for assistance (e.g., a 911 operator, a doctor, help staff, etc.). It is noted that assistant program 704 may be stored and/or executed remotely from switching device 204.

In accordance with an embodiment, the visual virtual assistant is synthetically-generated utilizing machine learning and artificial intelligence-based techniques. For instance, the visual virtual assistant may be based on a person that the user knows (i.e., the visual virtual assistant may be a deepfake of the person that the user knows). This way, the user will get the experience that he or she is speaking with someone that they know and trust.

In accordance with an embodiment, command 702 is periodically received in accordance with a predetermined period of time. For instance, suppose that a user is required to take medication at a certain time. Command 702 may be automatically issued at that time. The virtual assistant, in this case, may instruct the user how to take the medication and/or verify whether the user actually took the medication, e.g., by monitoring images taken by camera 232. In response to determining that the user is unresponsive or requires help, the virtual assistant may initiate a call and/or provide a notification to another user for assistance (e.g., a 911 operator, a doctor, help staff, etc.). It is noted that command 702 may be initiated and generated by switching device 204 and/or received via another interface, such as, but not limited to control interface 238.

In a further example, the triggering event may comprise a determination that the user is unresponsive. For instance, sensor(s) 702, camera 232, and/or microphone 234 may be utilized to determine whether a user is unresponsive. Examples of sensor(s) 702 include, but are not limited to, camera 232, microphone 234, a thermal imaging sensor, a motion sensor, a time of flight-based sensor, a wireless network-based sensor, a Bluetooth™-based sensor, a radio frequency (RF)-based sensor, a radar-based sensor and/or the like.

A thermal imaging sensor may be configured to form a heat zone image using infrared radiation. A thermal imaging sensor may be utilized to detect each time a user enters a particular environment (e.g., one or more rooms of the residence in which the user resides). A motion sensor may detect movement within the environment and may be utilized to detect each time the user enters the environment. A motion sensor may utilize infrared-based techniques, microwave-based techniques, ultrasonic-based techniques, vibration-based techniques, and/or the like.

A time-of-flight based sensor may be configured to measure the time-of-flight of a flight signal between a device (e.g., camera 232) and the user. The sensor may be utilized to determine a precise positioning of the user and whether the user is moving around.

A wireless network-based sensor (e.g., a Wi-Fi sensor) may be configured to sense radio waves from mobile devices carried by the user (e.g., mobile phones, tablets, etc.). The radio waves may be analyzed using triangulation techniques to track the location and/or movement of the mobile device (and therefore the user). A Bluetooth™-based sensor may be configured to sense radio waves (e.g., beacons transmitted via the radio waves) from mobile devices carried by the user (e.g., mobile phones, tablets, etc.). The radio waves may be analyzed using triangulation techniques to track the location and/or movement of the mobile device (and therefore the user).

An RF-based sensor may be configured to sense electromagnetic fields emitted from an RF antenna to identify and/or track an object to which the RF antenna is included. For instance, an RF antenna may be incorporated into a tag device held by the user. The tag device may further comprise a unique identification that uniquely identifies the user. The RF-based sensor may scan such tags to determine whether the user (including such tags) is located within an environment. The RF-based sensor may be utilized to track the movement of the user within the environment, etc.

The RF-based sensor (e.g., a radar-based sensor) may also be configured to emit RF signals, which ricochet off of various objects (including the user) in the user's environment. Such signals create unique patterns in the environment. These unique patterns change with the slightest disturbance in the environment, allowing a sensitive antenna to detect when someone (e.g., the user) moves in or enters the room.

Sensor(s) 702 may further comprise user-worn body sensors, which can provide a variety of types of physiological information. Such sensors include, but are not limited to thermometers, sphygmomanometers, heart rate sensors, shiver response sensors, skin galvanometry sensors, eyelid blink sensors, pupil dilation detection sensors, EEG and EKG sensors, glucose monitors, etc.

Camera 232 may be used to periodically obtain images of the environment in which camera 232 is located. Such images may be analyzed by switching device 204 determine whether the user is moving.

Microphone 234 may be periodically activated to detect the sound within the environment. If the decibel level remains relatively constant for a predetermined time period, it may be indicative that the user is not moving or unresponsive.

As also shown in FIG. 7, switching device 204 comprises an activity determiner 708. Activity determiner 708 may be implemented as hardware (e.g., electrical circuits), or hardware that executes one or both of software (e.g., as executed by a processor or processing device) and firmware. Activity determiner 708 is configured to receive sensor data from sensor(s) 702, images captured by camera 232 and/or audio signals captured by microphone 234. Activity determiner 708 is configured to analyze the sensor data, images, and/or audio files to determine a mobility index value associated with the user. The mobility index value indicates how mobile the user is. For instance, a relatively lower mobility index value may represent that a user is less mobile, whereas a relatively higher mobility index value may represent that a user is more mobile. If the sensor data, images, and/or audio signals are indicative that the user is mobile (e.g., moving around his or her environment), then the resulting mobility index value will be relatively higher. In contrast, if the sensor data, images, and/or audio signals are indicative that the user is not very mobile (e.g., is not moving around his or her environment), then the resulting mobility index value will be relatively lower.

Activity determiner 708 determines whether the determined mobility index value reaches a threshold condition. In the event that activity determiner 708 determines that the determined mobility index value reaches the threshold condition, then activity determiner 708 determines that the user is unresponsive. Activity determiner 708 may then issue a command (e.g., command 702) that causes power identification component 216 to determine the power state of sink device(s) and initiate the interaction with the assistant, as described above. In the event that activity determiner 708 determines that the determined mobility index value does not reach the threshold condition, then the interaction with the assistant is not initiated. In accordance with an embodiment, the threshold condition is whether the mobility index value falls below a predetermined threshold value (e.g., 0.4).

Figure 8:
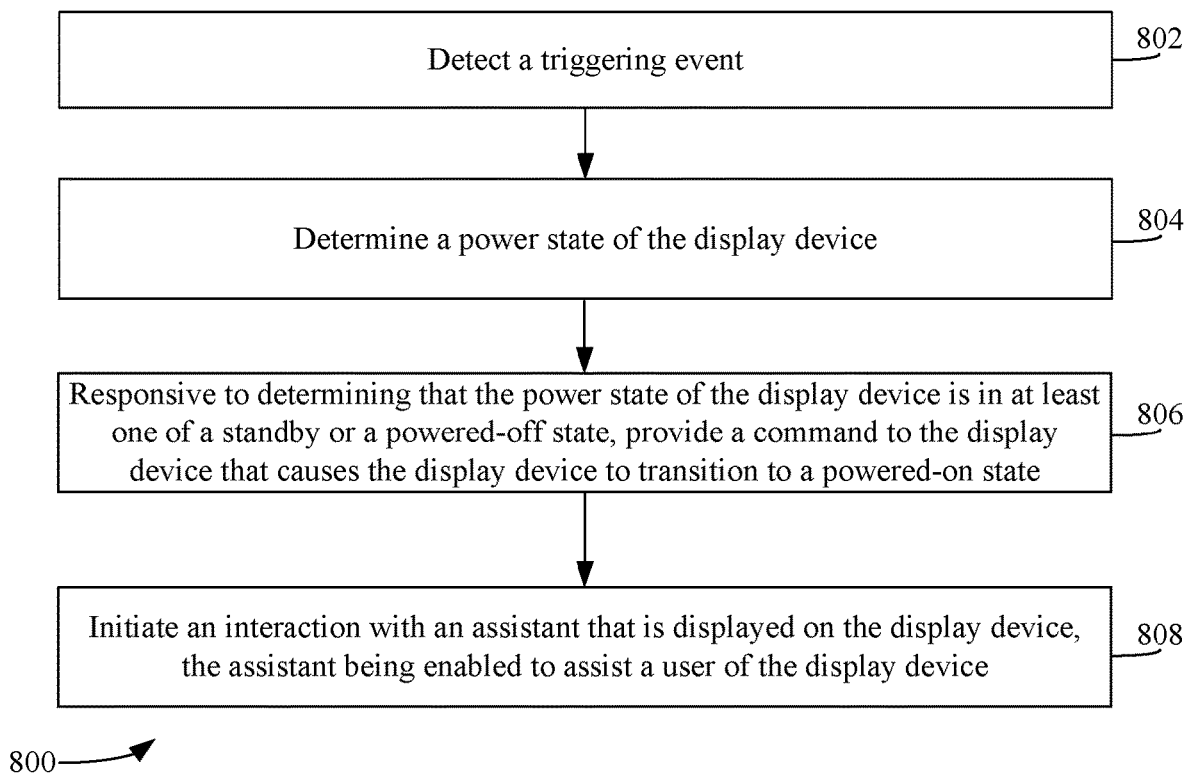
FIG. 8 depicts a flowchart of a method for determining whether a user is unresponsive and/or requires assistance in accordance with an example embodiment.

Accordingly, in embodiments, a determination may be made that a user is unresponsive and/or require assistance in many ways. For instance, FIG. 8 depicts a flowchart 800 for determining that a user is unresponsive and/or requires assistance in accordance with an embodiment. The method of flowchart 800 may be implemented by system 700 as described above in reference to FIG. 7. Accordingly, flowchart 800 will be described with continued reference to FIG. 7. Other structural and operational embodiments will be apparent to persons skilled in the relevant art(s) based on the following discussion regarding flowchart 800 and system 700.

Flowchart 800 begins with step 802. At step 802, a triggering event is detected. For example, with reference to FIG. 7, activity determiner 708 detects the triggering event.

At step 804, responsive to detecting the triggering event, a power state of the display device is determined. For example, with reference to FIG. 7, with reference to FIG. 7, activity determiner 708 may send a command to power state identification component 216, which determines a power state of sink device(s) 206 and/or speakers 209.

In accordance with one or more embodiments, detecting the triggering event comprises receiving a command via a network interface of the switching device, and the command is configured to initiate the interaction with the assistant. For example, with reference to FIG. 7, command 706 is received via network interface 238. Command 706 is configured to initiate the interaction with the assistant.

In accordance with one or more embodiments, the command is periodically received in accordance with a predetermined period of time. For example, with reference to FIG. 7, command 706 may be periodically received.

In accordance with one or more embodiments, detecting the triggering event comprises, determining that the user is unresponsive. For example, with reference to FIG. 7, activity determiner 708 may determine that the user is unresponsive.

In accordance with one or more embodiments, determining that the user is unresponsive comprises receiving sensor data from one or more sensor located in an environment in which the user is located, analyzing the sensor data to determine a mobility index value associated with the user, determining that the mobility index value meets a threshold condition, and responsive to determining that the mobility index meets the threshold condition, determining that the user is unresponsive. For example, with reference to FIG. 7, activity determiner 708 may receive sensor data from sensor(s) 702, analyze the sensor data to determine a mobility index value associated with the user, determine that the mobility index value meets a threshold condition, and responsive to determining that the mobility index meets the threshold condition, determine that the user is unresponsive.

In accordance with one or more embodiments, the sensor(s) comprise at least one of a camera, a motion sensor, a radio frequency (RF) or radar-based sensor, a thermal imaging sensor, a time-of-flight-based sensor, a wireless network-based sensor, or a radar-based sensor. For example, with reference to FIG. 7, sensor(s) 702 may comprise at least one of a camera, a motion sensor, a radio frequency (RF)-based sensor, a thermal imaging sensor, a time-of-flight-based sensor, a wireless network-based sensor, or a radar-based sensor.

At step 806, responsive to determining that the power state of the display device is in at least one of a standby or a powered-off state, a command is provided to the display device that causes the display device to transition to a powered-on state. For example, with reference to FIG. 7, responsive to determining that the power state of sink device(s) 206 and/or speakers 209 is in at least one of a standby or a powered-off state, switching device 204 provides a command to sink device(s) 206 and/or speakers 209 via a port of ports 210 that causes sink device(s) 206 and/or speakers 209 to transition to a powered-on state.

At step 808, an interaction with an assistant that is to be displayed on the display device is initiated, the assistant being enabled to assist a user of the display device. For example, with reference to FIG. 7, activity determiner 708 may execute assistant program 704, which renders an assistant via sink device(s) 206 or plays assistant via speakers 209.

In accordance with one or more embodiments, the assistant is a virtual assistant.

For example, with reference to FIG. 7, assistant program 704, when executed, may render a virtual assistant on sink device(s) 206.

IV. Further Example Embodiments and Advantages

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media (do not include communication media or modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The content recommendation embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 9:
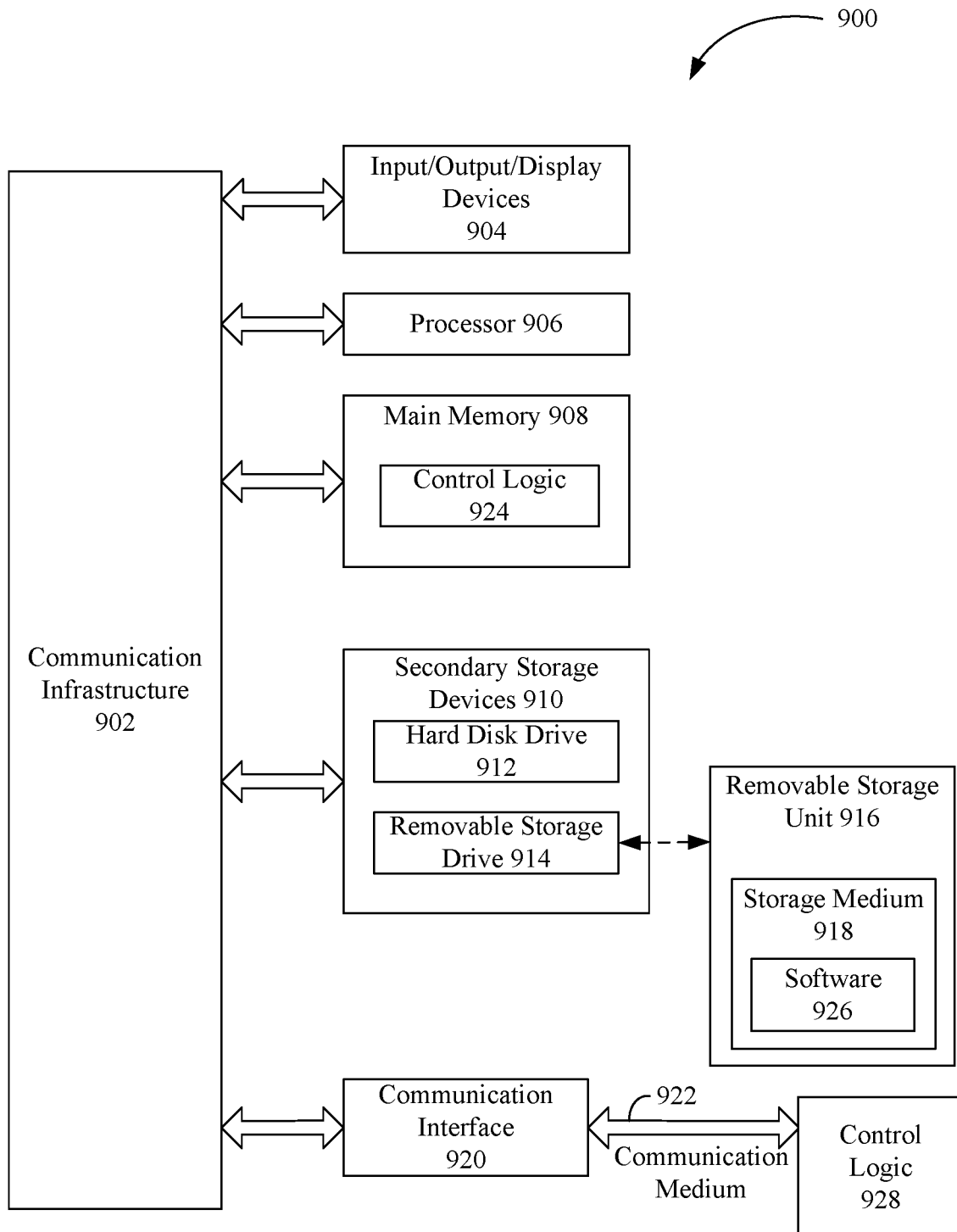
FIG. 9 is a block diagram of a computer system, according to an exemplary embodiment.

The embodiments described herein, including systems, methods/processes, and/or apparatuses, may be implemented using well known processing devices, servers, electronic devices (e.g., consumer electronic devices) and/or, computers, such as a computer 900 shown in FIG. 9. It should be noted that computer 900 may represent communication devices, processing devices, servers, and/or traditional computers in one or more embodiments. For example, switching device 104, Blu-ray player 102A, set-top box 102B, streaming media device 102C, television 102D, (as described above in reference to FIG. 1), source device(s) 202, switching device 204 (and/or the components thereof), sink device(s) 206 (as described above in reference to FIGS. 2 and 7), supervised machine learning algorithm 302 and sequence classification model 304 (as described above in reference to FIG. 3), sensor(s) 702 (as described above in reference to FIG. 7) and/or any of the sub-systems, components or sub-components respectively contained therein, and/or flowcharts 400, 500, 600, and/or 800 may be implemented using one or more computers 900.

Computer 900 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 900 may be any type of computer, including a desktop computer, a server, etc.

Computer 900 includes one or more processors (also called central processing units, or CPUs), such as a processor 906. Processor 906 is connected to a communication infrastructure 902, such as a communication bus. In some embodiments, processor 906 can simultaneously operate multiple computing threads.

Computer 900 also includes a primary or main memory 908, such as random access memory (RAM). Main memory 908 has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916.

Removable storage unit 916 includes a computer useable or readable storage medium 918 having stored therein computer software 926 (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well-known manner.

Computer 900 also includes input/output/display devices 904, such as touchscreens, LED and LCD displays, monitors, keyboards, pointing devices, etc.

Computer 900 further includes a communication or network interface 918.

Communication interface 920 enables computer 900 to communicate with remote devices. For example, communication interface 920 allows computer 900 to communicate over communication networks or mediums 922 (representing a form of a computer useable or readable medium), such as LANs, WANs, the Internet, etc. Network interface 920 may interface with remote sites or networks via wired or wireless connections.

Control logic 928 may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein V. Conclusion While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:
   detecting, by a switching device configured to selectively switch from receiving audio/video (A/V) signals originating from a first source device coupled to a first A/V port of the switching device to receiving A/V signals originating from a second source device coupled to a second A/V port of the switching device, a toggle command transmitted from a control device and configured to toggle a power state of a consumer electronic device;
   in response to detecting the toggle command, transmitting, by the switching device, a reference audio signal to the consumer electronic device for playback thereby;
   capturing, by the switching device, an audio signal via a microphone while the reference audio signal is played back by the consumer electronic device;
   comparing, by the switching device, the captured audio signal to the reference audio signal;
   determining, by the switching device, whether a level of similarity between the captured audio signal and the reference audio signal meets a threshold condition;
   in response to determining that the level of similarity between the captured audio signal and the reference audio signal meets the threshold condition:
      determining, by the switching device, that the consumer electronic device is in a powered-on state; and
      providing, by the switching device, a command to the consumer electronic device that causes the consumer electronic device to transition to one of a standby state or a powered-off state in response to determining that the consumer electronic device is in the powered-on state; and
   in response to determining that the level of similarity between the captured audio signal and the reference audio signal does not meet the threshold condition, determining, by the switching device, that the consumer electronic device is in at least one of the standby state or the powered-off state.

2. The method of claim 1, wherein the control device comprises:
   a remote control device.

3. The method of claim 1, wherein the reference audio signal comprises at least one of:
   an audio signal of a media content item provided to the consumer electronic device for playback thereby; or
   at least one of an audio tone or audio pattern provided to the consumer electronic device for playback thereby.

4. The method of claim 3, wherein the at least one of the audio tone or the audio pattern is an ultrasonic audio signal.

5. The method of claim 3, wherein comparing the captured audio signal to the reference audio signal comprises:
   generating an audio signature of the reference audio signal; and
   analyzing the captured audio signal to determine whether the captured audio signal comprises the audio signature.

6. The method of claim 1, further comprising:
   in response to determining that the consumer electronic device is in at least one of the standby state or the powered-off state, providing a command to the consumer electronic device that causes the consumer electronic device to transition to the powered-on state.

7. The method of claim 1, wherein the consumer electronic device is one of:
   the second source device; or
   a sink device.

8. A switching device configured to selectively switch from receiving audio/video (A/V) signals originating from a first source device coupled to a first A/V port of the switching device to receiving A/V signals originating from a second source device coupled to a second A/V port of the switching device, comprising:
   at least one processor circuit; and
   at least one memory that stores program code configured to be executed by the at least one processor circuit, the program code comprising:
      a power state identification component configured to:
         detect a toggle command transmitted from a control device and configured to toggle a power state of a consumer electronic device;
         in response to detecting the toggle command, transmit a reference audio signal to the consumer electronic device for playback thereby;
         capture an audio signal via a microphone while the reference audio signal is played back by the consumer electronic device;
         compare the captured audio signal to the reference audio signal;
         determine whether a level of similarity between the captured audio signal and the reference audio signal meets a threshold condition;
         in response to determining that the level of similarity between the captured audio signal and the reference audio signal meets the threshold condition:
            determine that the consumer electronic device is in a powered-on state; and
            provide a command to the consumer electronic device that causes the consumer electronic device to transition to one of a standby state or a powered-off state in response to determining that the consumer electronic device is in the powered-on state; and in response to determining that the level of similarity between the captured audio signal and the reference audio signal does not meet the threshold condition, determine that the consumer electronic device is in at least one of the standby state or the powered-off state.

9. The switching device of claim 8, wherein the control device comprises:

a remote control device.

10. The switching device of claim 8, wherein the reference audio signal comprises at least one of:

an audio signal of a media content item provided to the consumer electronic device for playback thereby; or at least one of an audio tone or audio pattern provided to the consumer electronic device for playback thereby.

11. The switching device of claim 10, wherein the at least one of the audio tone or the audio pattern is an ultrasonic audio signal.

12. The switching device of claim 10, wherein the power state identification component is configured to compare the captured audio signal to the reference audio signal by:

generating an audio signature of the reference audio signal; and analyzing the captured audio signal to determine whether the captured audio signal comprises the audio signature.

13. The switching device of claim 8, wherein the power state identification component is further configured to:

in response to determining that the consumer electronic device is in at least one of the standby state or the powered-off state, provide a command to the consumer electronic device that causes the consumer electronic device to transition to the powered-on state.

14. The switching device of claim 8, wherein the consumer electronic device is one of:

the second source device; or a sink device.

15. A computer-readable storage medium having program instructions recorded thereon that, when executed by at least one processor of a switching device, perform a method, the method comprising:

detecting, by the switching device, a toggle command transmitted from a control device and configured to toggle a power state of a consumer electronic device, wherein the switching device is configured to selectively switch from receiving audio/video (A/V) signals originating from a first source device coupled to a first A/V port of the switching device to receiving A/V signals originating from a second source device coupled to a second A/V port of the switching device;

in response to detecting the toggle command, transmitting, by the switching device, a reference audio signal to the consumer electronic device for playback thereby;

capturing, by the switching device, an audio signal via a microphone while the reference audio signal is played back by the consumer electronic device;

comparing, by the switching device, the captured audio signal to the reference audio signal;

determining, by the switching device, whether a level of similarity between the captured audio signal and the reference audio signal meets a threshold condition;

in response to determining that the level of similarity between the captured audio signal and the reference audio signal meets the threshold condition:

determining, by the switching device, that the consumer electronic device is in a powered-on state; and providing, by the switching device, a command to the consumer electronic device that causes the consumer electronic device to transition to one of a standby state or a powered-off state in response to determining that the consumer electronic device is in the powered-on state; and in response to determining that the level of similarity between the captured audio signal and the reference audio signal does not meet the threshold condition, determining, by the switching device, that the consumer electronic device is in at least one of a standby state or a powered-off state.

16. The computer-readable storage medium of claim 15, wherein the control device comprises:

a remote control device.

17. The computer-readable storage medium of claim 15, wherein the reference audio signal comprises at least one of:

an audio signal of a media content item provided to the consumer electronic device for playback thereby; or at least one of an audio tone or audio pattern provided to the consumer electronic device for playback thereby.

18. The computer-readable storage medium of claim 17, wherein the at least one of the audio tone or the audio pattern is an ultrasonic audio signal.

19. The computer-readable storage medium of claim 17, wherein comparing the captured audio signal to the reference audio signal comprises:

generating an audio signature of the reference audio signal; and analyzing the captured audio signal to determine whether the audio signal comprises the audio signature.

20. The computer-readable storage medium of claim 15, wherein the consumer electronic device is one of:

the second source device; or a sink device.

* * * * *